(12) United States Patent
Kuhn et al.

(10) Patent No.: US 9,070,247 B2
(45) Date of Patent: Jun. 30, 2015

(54) AUTOMATED VIRTUAL ASSISTANT

(71) Applicant: DIGIDEAL CORPORATION, Spokane Valley, WA (US)

(72) Inventors: Michael Kuhn, Spokane, WA (US); David Krise, Spokane, WA (US); Donald Evans, Spokane, WA (US); Kane Kuhn, Spokane, WA (US)

(73) Assignee: DIGIDEAL CORPORATION, Spokane, WA (US)

( * ) Notice: Subject to any disclaimer, the term of this patent is extended or adjusted under 35 U.S.C. 154(b) by 161 days.

(21) Appl. No.: 13/633,125

(22) Filed: Oct. 1, 2012

(65) Prior Publication Data

US 2013/0267319 A1 Oct. 10, 2013

Related U.S. Application Data

(63) Continuation-in-part of application No. 12/269,029, filed on Nov. 11, 2008, now abandoned.

(51) Int. Cl.
G07F 17/32 (2006.01)
G06N 99/00 (2010.01)
G06N 3/00 (2006.01)

(52) U.S. Cl.
CPC .......... *G07F 17/3211* (2013.01); *G07F 17/32* (2013.01); *G07F 17/3223* (2013.01); *G06N 99/005* (2013.01); *G07F 17/3239* (2013.01); *G07F 17/3276* (2013.01); *G06N 3/006* (2013.01); *G07F 17/322* (2013.01); *G07F 17/323* (2013.01)

(58) Field of Classification Search
None
See application file for complete search history.

(56) References Cited

U.S. PATENT DOCUMENTS 4,339,798 A * 7/1982 Hedges et al. .................. 463/26

OTHER PUBLICATIONS

Winter, Integrating Sensor Data into Flash MX 2004, Research Group Embedded Interaction, Technical Report No. 002, Apr. 21, 2005, pp. 1-28.*
Li, et al., (U.S. Application No. PCT/US03106218; dated Sep. 4, 2003).*
Li, et al., (U.S. Application No. PCT/US03106218; dated Sep. 4, 2003) discloses "intelligent personal assistants."*

* cited by examiner

*Primary Examiner* — Wilbert L Starks

(57) ABSTRACT

A system receives standard game output consisting of electronic signals for displaying text, numbers, and machine sounds and converts these signals to animated behavior and animated speech of a virtual human bystander shown on the audio-visual display. An interface receives data communication representing standard game states and standard game output from a separate electronic game, and uses the input to drive a virtual assistant projector, which animates an automated virtual assistant on the audio-visual display. A game output converter translates standard game states and standard game output from the interface into animated behavior information and animated speech information for input to the virtual assistant projector. Computer processing of the system can be operationally and communicatively isolated from a main game engine of the electronic game table.

17 Claims, 13 Drawing Sheets

AUTOMATED VIRTUAL ASSISTANT

RELATED APPLICATIONS

This patent application is a continuation-in-part application claiming the benefit of priority to U.S. patent application Ser. No. 12/269,029 to Kuhn, filed Nov. 11, 2008, and incorporated herein by reference in its entirety.

BACKGROUND

Some multiplayer casino games are hosted by a dealer or assistant, and some are not. A skillful, attractive, and helpful dealer adds a great deal to the entertainment experience. When the dealer can appropriately personalize dialogue with a player or a group of players, the players are better served and entertained, and the casino or gaming establishment also profits.

Virtual dealers presented on a video display associated with a multiplayer game can seem remote and mechanical. Virtual dealer interactions are generally prerecorded, directed strictly to the game action, and necessarily impersonal. At worst, such virtual dealers may repeat the same gesture or phrase too often and seem unrealistic, while at best, such virtual dealers make themselves conspicuous and are a constant reminder to players that the dealer is one step down from a live human host.

Live human game hosts are also sometimes ill-equipped to engage in personalized interaction with players. A particular human game dealer does not have immediate access to facts and history of each player that a player tracking system in a gaming establishment might have. Human hosts are typically required to rotate often, and it is difficult for humans to remember names and personal information for an entire segment of the public that moves through a casino.

What is needed is a virtual game dealer that is realistic, intelligent, and entertaining. Such a virtual game dealer would be better than a human host in several significant ways. The virtual game dealer would have access to a database of player characteristics and preferences that a human host does not have. Moreover, such a virtual game dealer would be able to observe and store learned patterns in order to provide sophisticated interactions and services.

SUMMARY

A system includes a video and audio display, an interface connected to the video and audio display suitable for receiving data communication representing standard game states and standard game output from a separate electronic game, a virtual assistant projector to animate an automated virtual assistant on the video and audio display, and a game output converter to translate standard game states and standard game output from the interface into animated behavior information and animated speech information for input to the virtual assistant projector. Computer processing of the system is operationally and communicatively isolated from a main game engine of the electronic game table. An apparatus implementation includes an audio-video display, a stand for supporting the audio-video display and for placing the audio-video display in a standalone position near the separate electronic game, an interface for receiving standard output from the separate electronic game, and a converter for translating the standard game output to an animated behavior and an animated speech of a virtual human bystander being shown on the audio-video display.

This summary section is not intended to give a full description of virtual game dealers based on artificial intelligence, or to provide a list of features and elements. A detailed description of example embodiments of the electronic gaming system follows.

DETAILED DESCRIPTION

Overview

Figure 1:
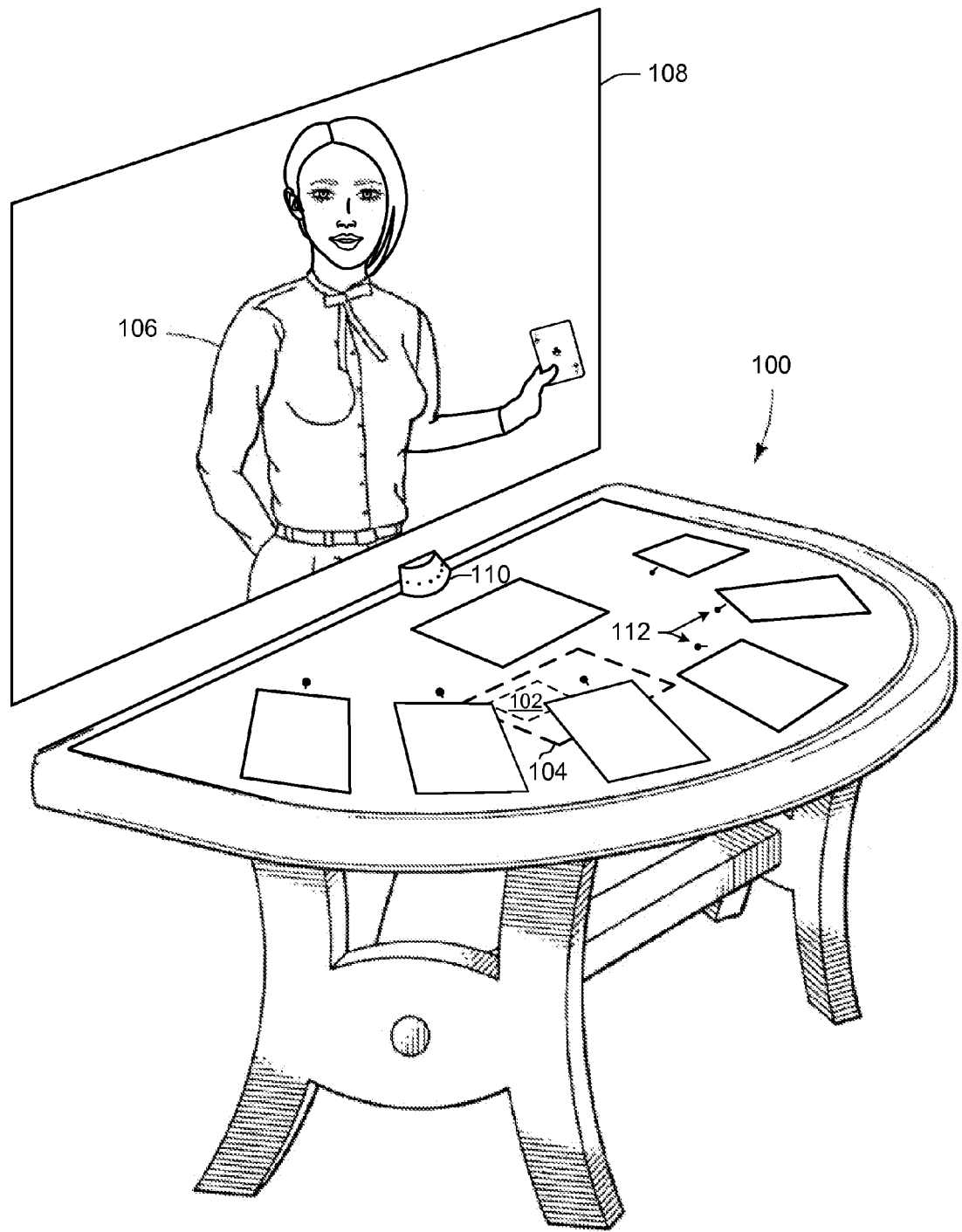
FIG. 1 is a diagram of an exemplary electronic game table including a virtual game dealer based on artificial intelligence.

This disclosure describes virtual game dealers that are based on artificial intelligence. In one implementation, as shown in FIG. 1, an electronic game table 100 keeps a real time inventory of game states and player attributes for one player or for multiple players at the electronic game table 100. The electronic game table 100 then applies artificial intelligence techniques, e.g., via an artificial intelligence (AI) engine 102 hosted by a computing device 104, to analyze and prioritize a complex of player-game circumstances and to respond appropriately. The electronic game table 100 interacts with the one or more players by projecting a virtual dealer 106 that responds to and interacts with players in a player-dealer relationship that aims to be socially appropriate and dynamically responsive in real time. The electronic game table platform of FIG. 1 is described in greater detail below with respect to FIGS. 10-12.

Figure 2:
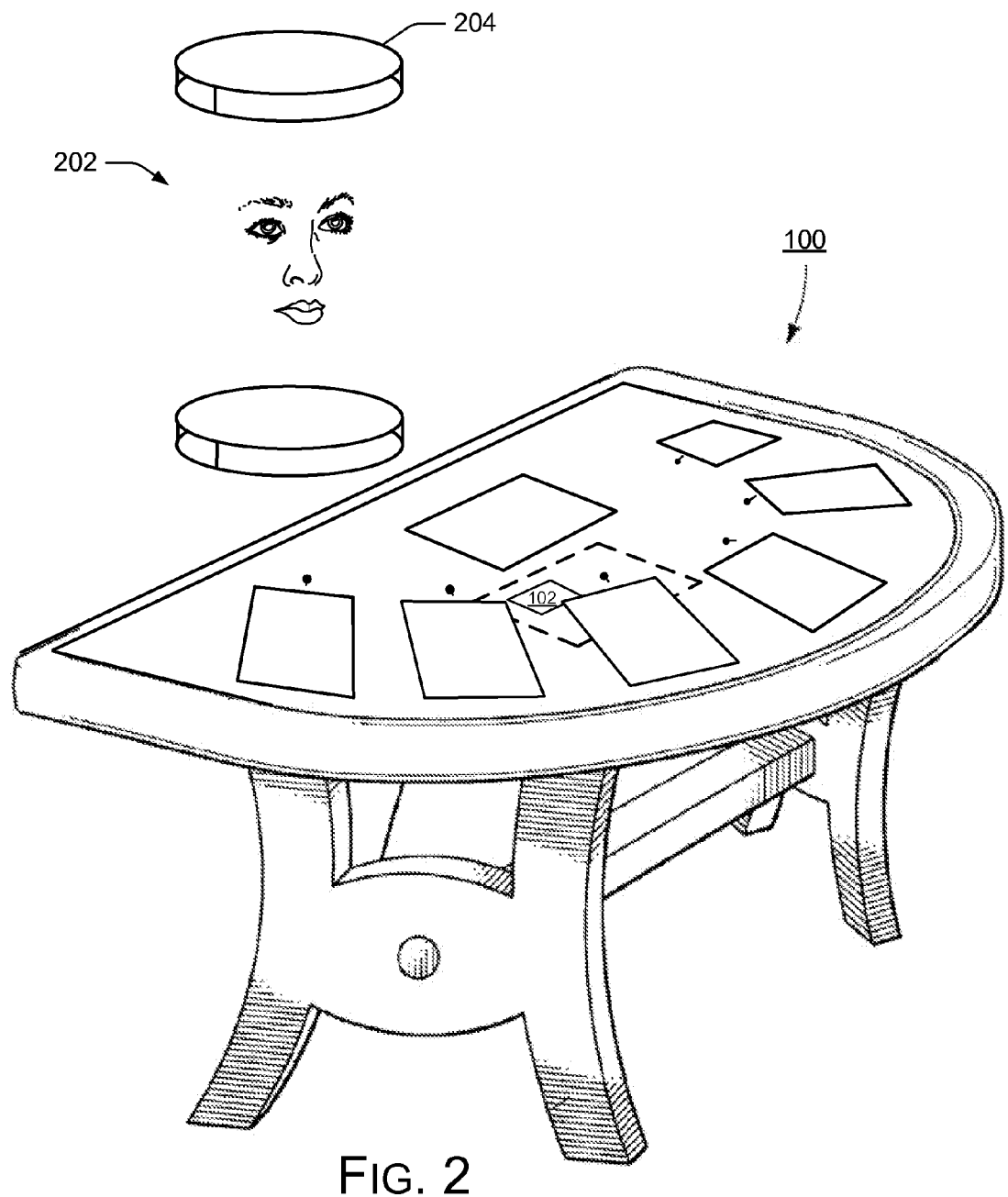
FIG. 2 is a diagram of an exemplary electronic game table including a holographic virtual game dealer based on artificial intelligence.
Figure 3:
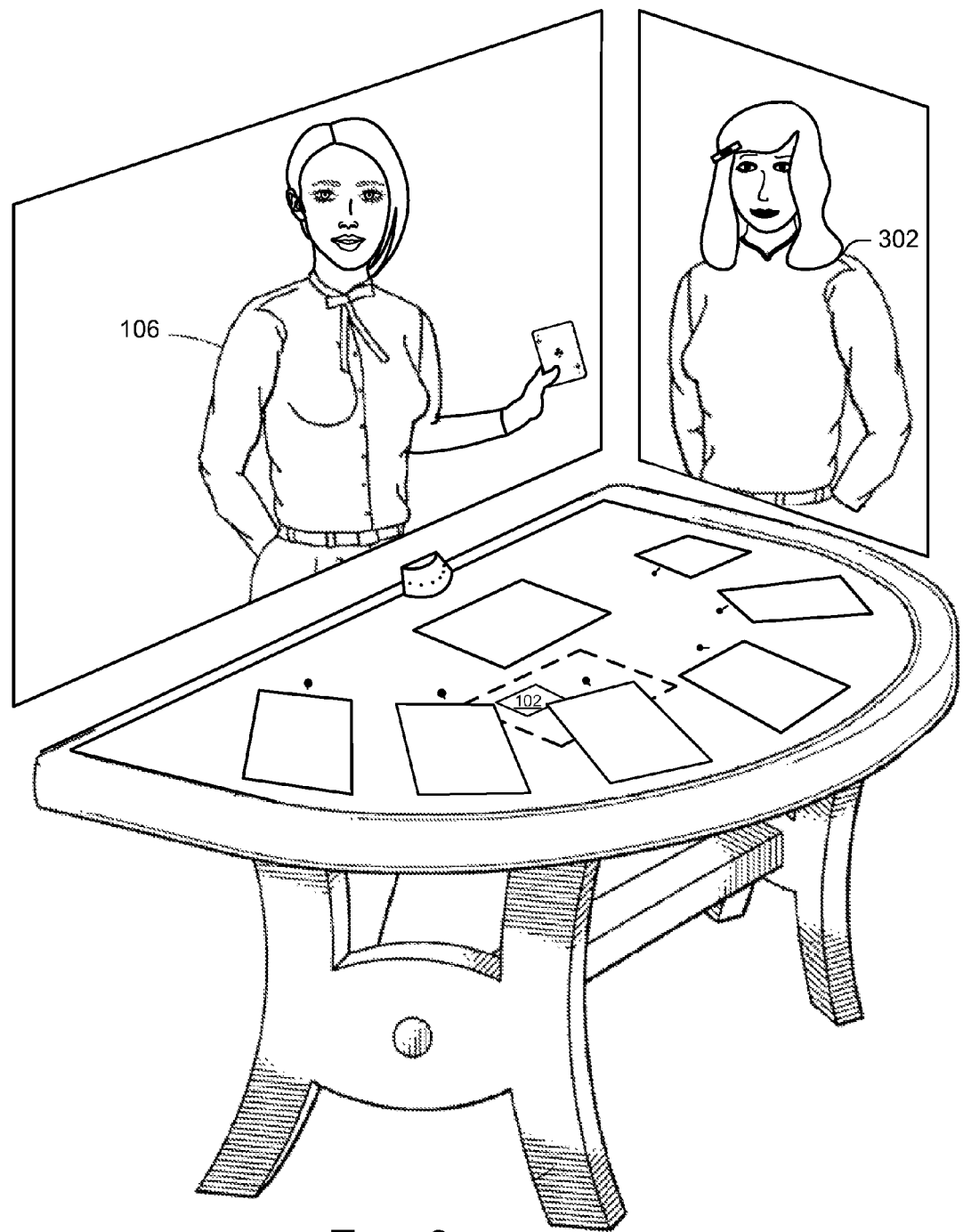
FIG. 3 is a diagram of an exemplary electronic game table including a virtual player based on artificial intelligence and a virtual game dealer based on artificial intelligence.

The virtual dealer 106 (also referred to as a "virtual host") may be an audio-video projection on a display screen 108. As shown in FIG. 2, the virtual dealer 106 may also be a hologram 202 displayed by a hologram projector 204, typically with accompanying audio. Or the virtual dealer 106 may be a robot, manikin, etc. FIG. 3 shows a variation, in which one or more virtual players 302 (or virtual bystanders) are animated by artificial intelligence instead of or in addition to the virtual dealer 106. When both virtual dealer 106 and one or more virtual players 302 are used, the virtual dealer 106 and virtual players 302 can also discourse and interact with each other, for informational or entertainment purposes. Virtual players 302 may also be holograms, robots, and so forth.

In one implementation, player information input to the AI engine 102 supporting the virtual dealer 106 is retrieved from a player tracking system when a player swipes an identity card or a smart card, i.e., the player information is previously gathered with respect to an individual player. Real time game flow and game state information is also fed to the AI engine 102. In another implementation, the AI engine 102 also relies on perceptual input, i.e., machine vision via cameras 110, and natural language processing via input from microphones 112 to emulate authentically human behavior, including emotional reactions. For example, FIG. 1 shows a directional microphone 112 assigned to each player, and a set of webcam style cameras 110, one camera 110 assigned to each player.

Rather than presenting the exemplary virtual game dealers 106 described herein as electronic game tables 100 that display or project a virtual dealer 106, the electronic game table 100, the underlying artificial intelligence 102, and the projected virtual dealer 106 will be referred to collectively herein as "the virtual dealer" 106.

A relatively elementary implementation of the virtual dealer 106 may engage in appropriately intelligent dialogue with human players while a more sophisticated version of the virtual dealer 106 constitutes an emulated human agent that has learning capability and displays a full range of emulated human reactions, gestures, speech, etc. In one implementation, the virtual dealer 106 uses custom greetings, e.g., using surnames or nicknames, cites sport fan affiliations, and may use geographical monikers and comments specific to a player's region or country. Such speech may be a simple as "Hello Joe" to "It's probably raining in Seattle today, Jane." The virtual dealer 106 may make personal references to a birthday or other events, such as custom celebrations. The virtual dealer 106 may make game-oriented comments, such as "nice hit, Dave", "great bet, Johnnie" to consoling comments, such as "better luck next time, Peggy". The virtual dealer 106 can also engage in random dialogue from the current game session, from previous sessions of the same game, or previous sessions from different locations: "hope you're as lucky here as you were at the MGM." In one implementation, the virtual dealer 106 can add visual emotional affectation and associated gestures to the verbal speech. The virtual dealer 106 can also provide additional entertainment functions, such as performing chip tricks, acting as bartender, and telling stories, etc.

In one implementation, additional information that causes the virtual dealer 106 to speak and act can be entered via a keypad or other player interface, such as touch screen display. Likewise, player attributes can be passed to the virtual dealer 106 from a player reward card, from signing up for the card, etc. The players can change a nickname through the virtual dealer 106, sign up for a player card, place drink orders and preferences, call a host to the table, and so forth. The virtual dealer 106 can accomplish most tasks that a human game host can perform, with one-way accessible information from a player attributes database integrated with current or historical game activity.

Example Systems

Figure 4:
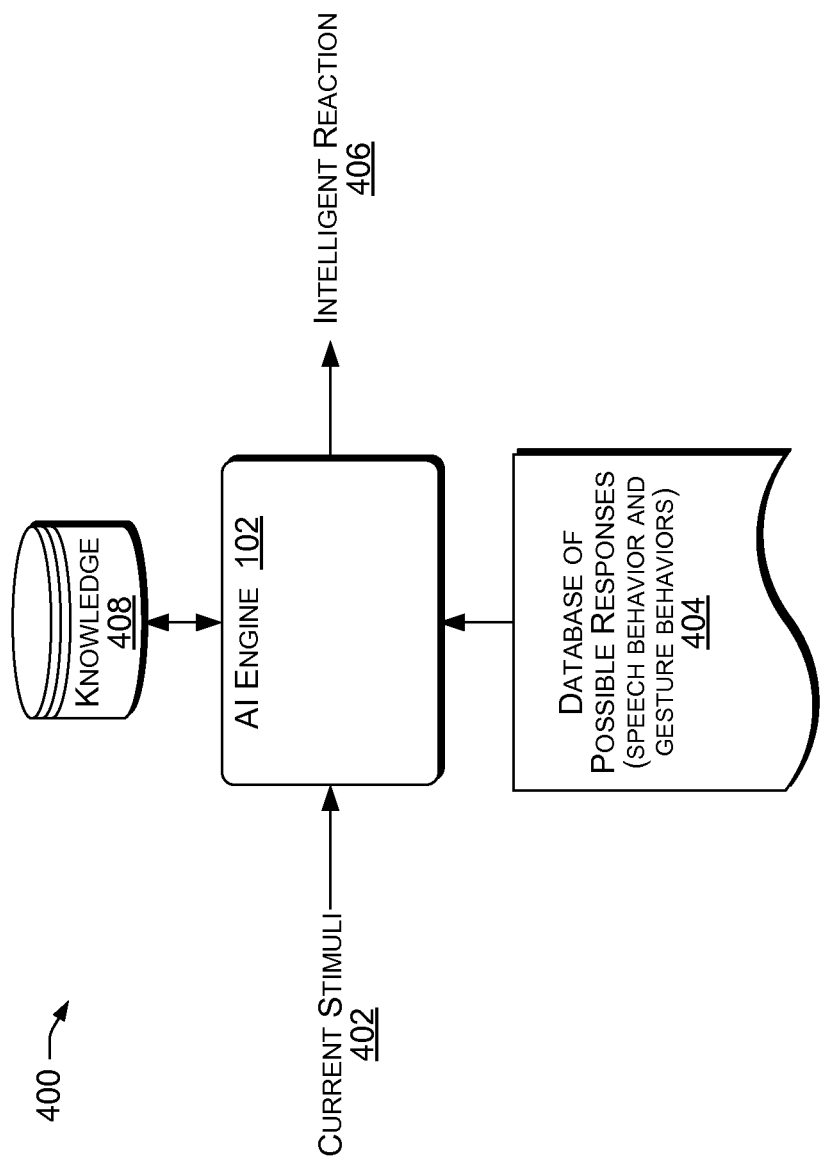
FIG. 4 is a block diagram of an exemplary environment for an artificial intelligence (AI) engine supporting a virtual game dealer.

FIG. 4 shows an exemplary arrangement 400 of the AI engine 102 and associated inputs and outputs in a game table setting. The AI engine 102 considers current stimuli 402, such as identities and attributes of one or more players, in light of a database of possible responses 404. Through various techniques of machine intelligence, to be described below, the AI engine 102 determines an intelligent reaction 406 to the current stimuli 402. The AI engine 102 may find associations between different manifestations of the current stimuli 402, and may learn associations made between stimuli 402 and intelligent reactions 406, which can then be stored as knowledge 408 for future decision-making. The knowledge 408 may also include a memory record of past stimuli 402, which becomes information to consider during future decision-making. For example, the AI engine 102 may store a record of a player's verbal input or a player's user interface input as data to consider when interacting with that player in the future. Thus, the virtual dealer's interactions with the player may become more sophisticated over time.

Figure 5:
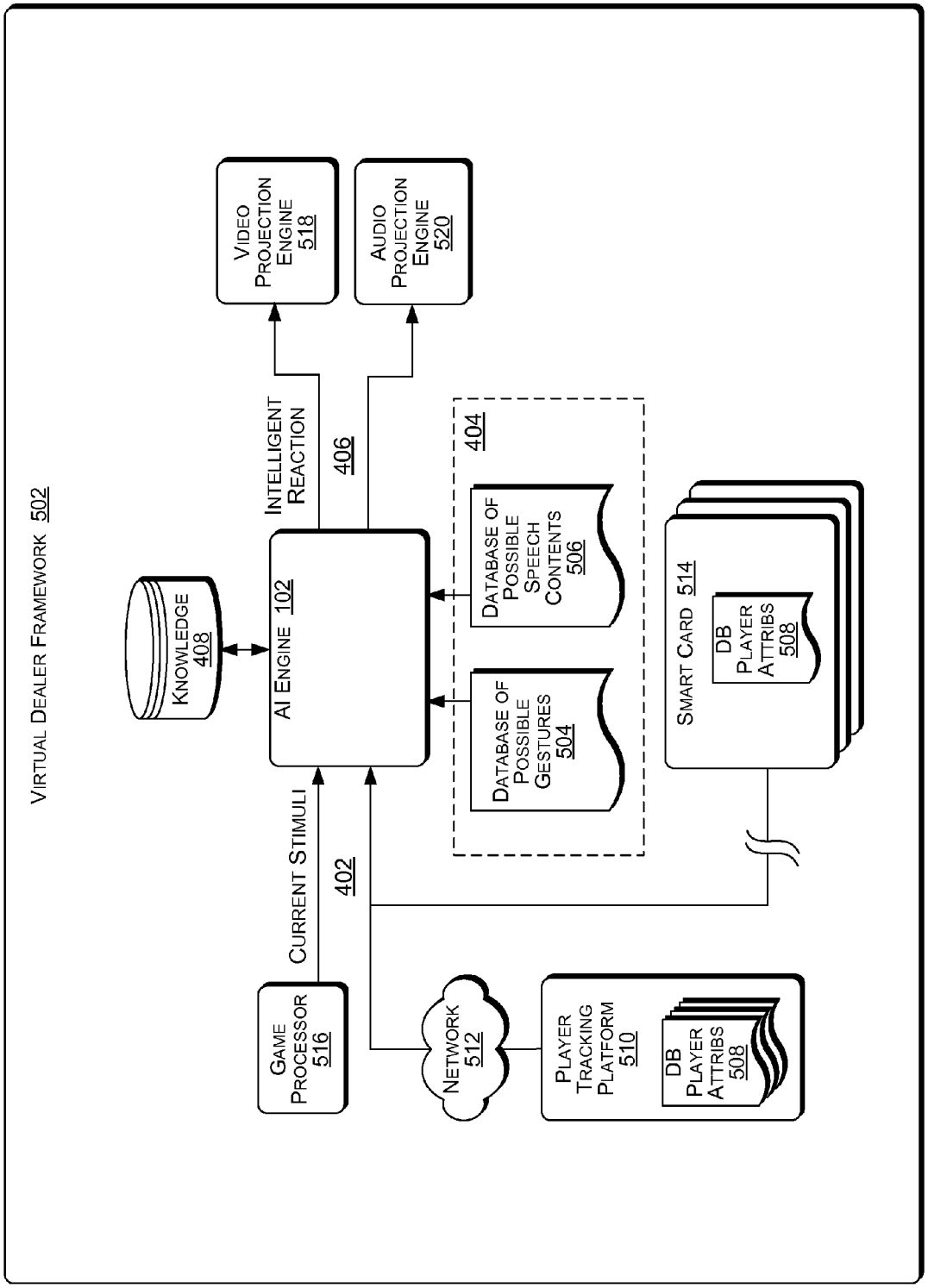
FIG. 5 is a block diagram of an exemplary virtual dealer framework.

FIG. 5 shows an exemplary virtual dealer framework 502 that can be included in an electronic game table 100. The virtual dealer framework 502 creates a virtual dealer 106 that dialogues and responds in an intelligent manner to a player, based on stored information about the player. The exemplary virtual dealer framework 502 is one example configuration for the sake of description. Other arrangements of the same or similar components can also be used to make a virtual dealer framework 502.

The virtual dealer framework 502 includes the AI engine 102, a database of possible responses 404, including a database of possible virtual dealer gestures 504 and a database of possible speech contents 506; a database of knowledge 408, and components that source current stimuli 402, components that process output signals that represent intelligent reactions 406. The sources of current stimuli 402 include a database of player attributes 508 that may reside in a player tracking platform 510 communicatively coupled to the AI engine 102 via a network 512, such as a local area network or the Internet. The database of player attributes 508 may also exist on a smart card 514 used by the player to log-on to the electronic game table 100 or the local gaming network of a casino establishment. Another source of current stimuli 402 for the AI engine 102 is the game processor 516 of the electronic game, which passes game state information to the AI engine 102. The output of the AI engine 102 representing intelligent reactions 406 constitutes a signal for a video projection engine 518 and an audio projection engine 520 to execute virtual dealer behavior and speech.

Figure 6:
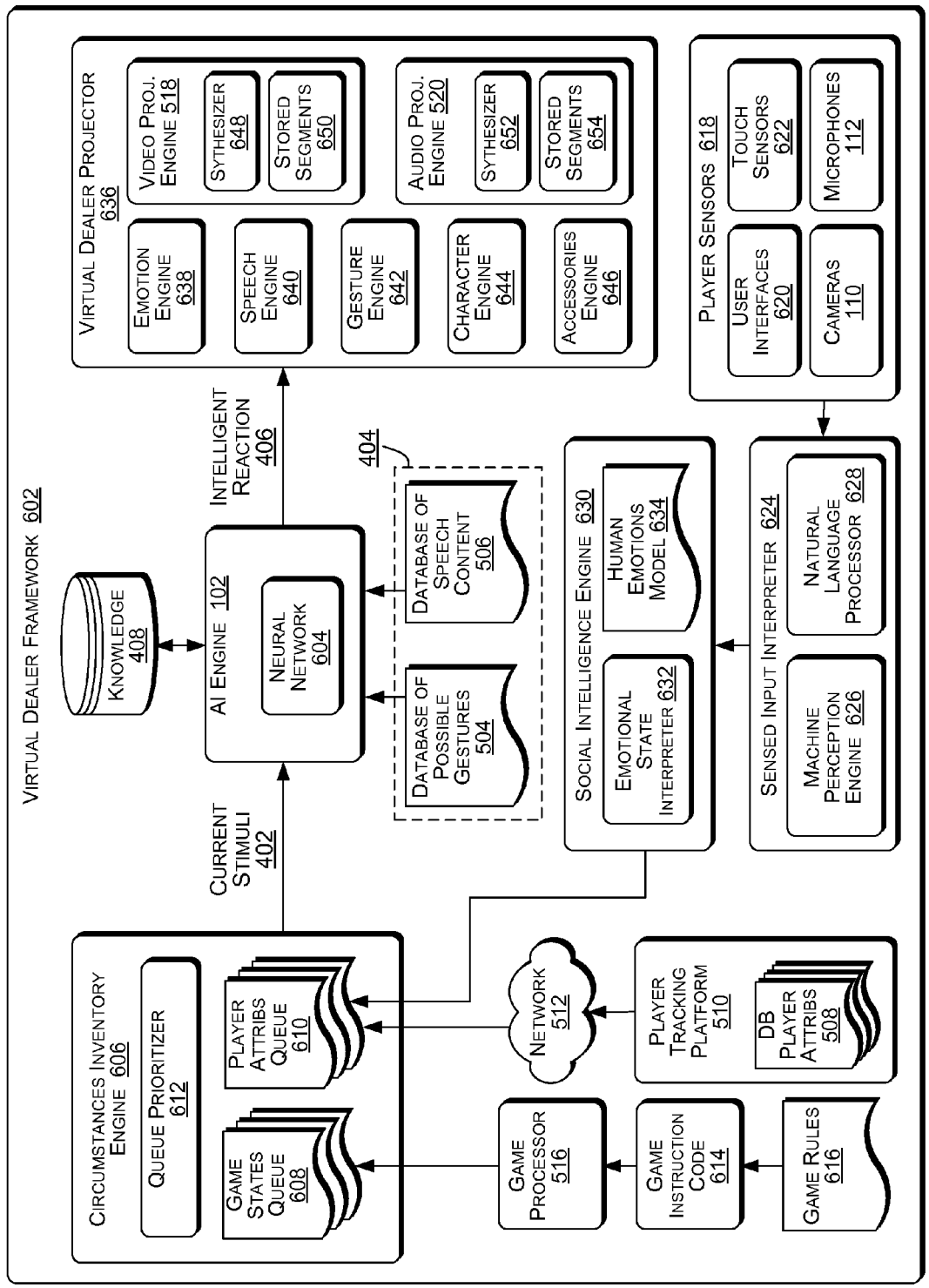
FIG. 6 is a block diagram of a second exemplary virtual dealer framework.

FIG. 6 shows another exemplary virtual dealer framework 602. The exemplary virtual dealer framework 602 is one example configuration for the sake of description. Other arrangements of the same or similar components can also be used to make a virtual dealer framework 602. The virtual dealer framework 602 includes the AI engine 102, the database of possible responses 404, which includes a database of possible virtual dealer gestures 504 and a database of possible speech contents 506; the database of knowledge 408, components that source the current stimuli 402, and components to process an output signal representing intelligent reactions 406. In one implementation, the AI engine 102 includes a neural network 604. However, other artificial intelligence techniques may be applied within the AI engine 102, as will be discussed further below.

The current stimuli 402 that is input to the AI engine 102 are collected and organized at a circumstances inventory engine 606. The circumstances inventory engine 606 includes at least a game states queue 608 and a player attributes queue 610 to collect current game states and player states. A queue prioritizer 612 may reorder the contents of the queues based on importance of the entries. For example, in one implementation the queue prioritizer 612 maintains the game states queue 608 and the player attributes queue 610 based on temporality, so that the most recent events and circumstances are at the tops of the queues, and are deemed most immediately important.

The circumstances inventory engine 606 collects information about the players and about the game. Thus, the circumstances inventory engine 606 receives data from the game processor 516, which in turn processes information about game flow while executing game instruction code 614 and the game rules 616. The circumstances inventory engine 606 can receive stored player information, e.g., over a network 512, from a player tracking platform 510 containing a database of player attributes 508.

In one implementation, as shown in FIG. 6, the circumstances inventory engine 606 gains empirical player information via physical player sensors 618. The player sensors 618 may include cameras 110, microphones 112, user interfaces 620, and touch sensors 622. In one implementation, the perceptual information from the player sensors 618 is passed to a sensed input interpreter 624, which may include a machine perception engine 626 and a natural language processor 628. The sensed input interpreter 624 can assign meanings, including symbols, to the raw sensory input of the player sensors. For example, the machine perception engine 626 may recognize a player's face or gesture, while the natural language processor 628 may recognize keywords and phrases spoken or typed by the player.

In one implementation, the sensed input interpreter 624 passes recognition of meaningful gestures and speech to a social intelligence engine 630, which may further interpret potentially meaningful gestures and speech on an even higher level than mere recognition. For example, the social intelligence engine may assign a player intention to a recognized gesture or word. In one implementation, the social intelligence engine 630 assigns an emotion, when relevant, to a player's speech, gesture, or other input, e.g., via a user interface. The social intelligence engine 630, therefore, may include an emotional state interpreter 632 which may rely in part on a human emotions model 634. The meaning and social/emotional implications, if any, of a player's words and gestures are passed to the player attributes queue 610 of the circumstances inventory engine 606.

The AI engine 102 uses artificial intelligence to associate game states and player attributes with possible virtual dealer gestures 504 and speech content 506. Associations can be saved as knowledge 408, enabling the AI engine 102 to learn and to create more sophisticated interactions with a given player over time.

The output of the AI engine 102 is a signal representing intelligent reactions 406 for the virtual dealer 106, to be projected by the virtual dealer projector (projection engine) 636. The virtual dealer projector 636 may break the task of generating the virtual dealer 106 into several components. Thus, the virtual dealer projector 636 may have an emotion engine 638, a speech engine 640, a gesture engine 642, a character engine 644, and an accessories engine 646. The virtual dealer projector 636 also includes a video generator 518 and an audio generator 520. The video generator 518 may include a video synthesizer 648 to animate a video dealer image or avatar and/or may include stored video segments 650 or "clips" that can be executed to generate virtual dealer behavior. Likewise, the audio generator 520 may include an audio synthesizer 652 to generate artificial speech and/or may include stored audio segments 654 that can be executed to generate virtual dealer speech and sounds.

Overview of Operation of the Exemplary Virtual Dealer Frameworks

The virtual dealer framework 602 may gather visual and audio cues (i.e., behavioral cues) of a player or multiple players via the player sensors 618, including cameras 110 and microphones 112. Multiple players are also referred to herein as the company around an electronic game table 100. The behavioral cues can be gathered by camera 110 and microphone 112 in real time to be entered along with other player attributes 610 and game states 608 into the AI engine 102 for computing/inferring an appropriate response to the input. When a particular implementation of the electronic game table 100 connects to a network 512 and/or the player logs on to the game equipment with a smart card 514 or other player identifier, the electronic game table 100 may gain access to a relatively large and frequently updated historical database of player attributes 508.

Some behavioral cues of a player can be gathered from the manner in which the player plays the game and from the player's betting behavior, i.e., the behavioral cues are gathered by looking at the game itself. It should be noted from the outset that gathering information about the player, including the player's real time game playing behavior is kept strictly isolated from the execution of the game itself. That is, the projection of an apt or sympathetic virtual dealer 106 is never used for or against the player with respect to the game flow and its outcome. Rather, the exemplary virtual dealer 106 provides information and entertainment and performs the duties usually attributable to a human dealer in the game at hand.

In one embodiment, the exemplary virtual dealer 106 possesses many entertaining and attractive characteristics that a human dealer would have, including neutrality to influencing the outcome of the game while having a propensity to side with the players and cheer for them; willingness to render service during interactions with the human players, skill in carrying out dealer functions during the game, a knowledge-base of the game and its rules, a sense of humor, emotional responsiveness, style, a feel for when to indulge in familiarity with the players, a feel for when to withdraw into the background and stay silent, and timing to know when to add levity and when to provide serious information.

In one implementation, behavioral logic of the virtual dealer 106 is driven by the AI engine 102, which selects a current emotion most likely to fit current circumstances, to be executed by the emotion engine 638. In one implementation, the virtual dealer establishes current circumstances by assessing the state of the game 608. When the game is going badly for one or more player, overly cheerful emotions to be displayed by the virtual dealer 106 are moderated. A big win triggers energetic emotions for the virtual dealer 106 to display, i.e., facial affect and gestures associated with surprise and congratulations. Return of a long absent player generates a happy mood appearance for execution by the emotion engine 638. In one implementation, the virtual dealer selects a mood or emotion to execute based on an assessment of the game state 608, the company of players at the electronic game table 100, and one or more recognized emotions of the players, i.e., by sensing emotion using computer vision 626 or an audio/speech recognition algorithm, such as natural language processing 628, or by player input from a user interface 620.

Similar to the virtual dealer 106 adopting emotions 638 to fit circumstances 606, the virtual dealer 106 may adopt certain personas based on the players around the electronic game table 100 and their player attributes 610. When a player orders a drink, for example, the virtual dealer may adopt the persona and character 644 of a "bartender." The personas to be executed by the character engine 644 do not always have to be presented visually; a persona may be manifested as only a style of speaking that is executed by the speech engine 640. Or, the persona may be accompanied by related visuals to be executed by the gesture engine 642. Example personas and affectations that can be executed by the emotion engine 638 include a happy-go-lucky affect, a sincere affect, a matter-of-fact affect, a flirtatious affect, etc.

When the projected visuals match the current persona, various stereotype figures may be selected by the character engine 644 as the virtual dealer 106. Example characters that can be adopted to be the figure of the exemplary virtual dealer 106, e.g., suitable for a particular casino, include a clean-cut Marine figure, a Native American figure, an eighteenth century ship's captain figure, a Las Vegas entertainer figure, a professional athlete figure, a hunter figure, a fireman figure, and select famous historical personalities. In one implementation, the exemplary character engine 644 can even assign movie star figures and cartoon characters.

In one implementation, besides being equipped with speech recognition capabilities, e.g., via a natural language processor 628, the exemplary virtual dealer 106 can also measure the sound level of the players in real time, and react accordingly. For example, one reaction to a loud sound level is for the exemplary virtual dealer 106 to appear to stop, look, and listen, and in some implementations to actually look and listen via camera 110 and microphone 112 for verbal and visual input from the players.

When asked, or when circumstances seem appropriate, the exemplary virtual dealer 106 may give game tips to a player. For example, when input from the game processor 516 indicates that a player's choices during a game fall outside of established parameters, this may trigger an advice-giving mode (e.g., asking for a "hit" in Blackjack when the player holds cards worth a value of "twenty"). The virtual dealer 106 may visually turn in the direction of the player being addressed, and make hand gestures toward that player. The virtual dealer 106 may give tips when asked, i.e., via a user interface or via speech recognition of key words spoken by the player. A dialogue with the player may follow in order to check or verify the player's request. Likewise, the virtual dealer 106 may state game rules 616 when asked or prompted, or when an attempt at an illegal move or play is made.

In one implementation, the exemplary virtual dealer 106 detects the "body language" of a player and either reacts to the body language with an appropriate verbal or gesture response, or copies/mimics the body language for entertainment value, i.e., by directly mimicking the body language, or by subtly falling into a similar body language rhythm as the player. For example, the virtual dealer 106 may move a virtual body part in an attenuated mimic of the player's breathing rhythm, hand-tapping rhythm, or head-nodding rhythm.

In one implementation, a player may select (e.g., via the character engine 644) not only the character of the virtual dealer 106 but may also select via the accessories engine 646 the virtual dealer's attire, inputting selections via a user interface 620 or via microphone 112 and speech recognition 628. In one implementation, the AI engine 102 causes the virtual dealer 106 to react to being "dressed" or outfitted by the players. For example, a virtual dealer 106 may react with surprise or feigned disgust at being dressed in cowboy attire and may offer witty verbal reactions.

In one implementation, the virtual dealer 106 performs chip tricks, card tricks, etc., ("game-piece tricks") as suggested by circumstances and executed by the gesture engine 642. For example, a player may directly ask the virtual dealer 106 to perform a chip trick. Or the virtual dealer 106 may sense that a player is performing a chip trick and respond with another virtual chip trick and a verbal response, e.g., "have you seen this one?" The virtual dealer 106 may also perform game-piece tricks when the virtual dealer 106 appears to be thinking. The virtual dealer 106 may mimic a chip trick or other game-piece trick or movement being executed by a player, especially when the particular implementation of the electronic game table 100 is outfitted with cameras 110 and machine vision 626 to detect player movements in detail.

In one implementation, the appearance, style, verbal tone, and verbal content of the virtual dealer 106 changes depending on how the game or sequence of games progresses, or in reaction to the content of the player's conversation. For example, in one scenario the appearance of the virtual dealer 106 is initially normal, but morphs into a god-of-thunder character with stormy wind blowing in the background when the house loses a threshold number of times in a row. In another example, the virtual dealer changes attire to fit the conversation, for example, during sports-centered conversation, when the virtual dealer framework 602 senses a threshold number of trigger words (e.g., "football," "touchdown") the virtual dealer 106 may disappear and reappear in a football jersey. This topic-centered awareness can be extended to other subjects, so that when the virtual dealer framework 602 senses a threshold number of trigger words, the clothes or artifacts related to the topic appear in the displayed visuals.

In one implementation, the virtual dealer 106 has information about each player from the outset, when each player logs on or when the player inserts an ID card or smart card 514 and the card or an associated network 512 connects to a database of player attributes 508. The virtual dealer 106 accesses the database of player attributes 508, and may greet the player by name and may even introduce players to each other. The virtual dealer 106 may recite interesting stories, news, and anecdotes, based on knowledge of the player attributes. The virtual dealer may indulge in 3-way conversations with two or more players, or may discourse with one player about another player.

In one implementation, the virtual dealer 106 learns to interact with each player over time. That is, a first encounter with a new player may begin with very simple and rudimentary interactions. The virtual dealer 106 may test the player's desire to be more interactive with the virtual dealer 106. For example, in one implementation each player communicates with the virtual dealer 106 by addressing the virtual dealer 106 with "Dealer . . . " or with the virtual dealer's name, as shown at the gaming table 100 or worn on a name tag by the virtual dealer 106. The virtual dealer 106 can gauge the player's desire for interaction based on the number of times the player addresses the dealer 106. The virtual dealer 106 can build a database of player characteristics (e.g., the player is known to like a continuous supply of coffee) to be stored as knowledge 408 as a sequence of game rounds progresses. Likewise, the virtual dealer 106 can build a sophisticated profile of the player to be stored as knowledge 408 over multiple different encounters with the player, if the player becomes a "regular."

The virtual dealer 106 can be made highly sensitive to stimuli. For example, in one implementation the virtual dealer 106 stops speaking when interrupted by a player, and responds in some favorable manner to the act of being interrupted, or the content. The virtual dealer 106 typically changes the direction of conversation based on the interruption. An appropriate response as provided by the AI engine 102 is placed at the top of the virtual dealer's conversation queue in the speech engine 640, and the topic being interrupted is ordered second, or further down in the queue. When the conversation shifts back to the previous topic, the virtual dealer 106 may use a common idiom, such as, "now, as I was saying . . . "

In one implementation, when allowed by the rules of the game and by the regulations of the local legal jurisdiction, the virtual dealer 106 may have an autoplay mode in which the player can request that the virtual dealer 106 play in proxy for the player, that is, the electronic game table 100 selects the next logically best card hand, or selects which cards to discard out of a hand, etc. This type of virtual dealer behavior is sometimes forbidden by local regulation. However, many games and jurisdictions allow for the best arrangement of a card hand, for example, to be computed by the electronic game, if the player so chooses. If the player selects an autoplay mode or action, the virtual dealer 106 may make a hand gesture, such as pointing or waving a virtual hand, when each autoplay move is executed.

The virtual dealer framework 602 includes components to generate virtual dealer appearance, speech, and behavior that are based upon artificial intelligence applied to the processing of complex input. The virtual dealer appearance, speech, and behavior are sent to the virtual dealer projector 636, which can interface with various display modalities. In one implementation, the display is one or more 2-dimensional video displays 108. When multiple display screens 108 are used, the virtual dealer 106 may move between the multiple displays as if the virtual dealer were a real person. In another implementation, the display is a holographic projector 204 that leverages holographic transform information to generate a 3-dimensional virtual dealer 202.

In an alternative embodiment, a virtual player 302 is generated instead of a virtual dealer 106. One or more virtual players 302 provide an entertaining way to attract players to the electronic game table 100, especially when each virtual player is holographic, projected onto a glass surface, or projected as a facial video of the player onto a blank-face manikin.

Example Method

Figure 7:
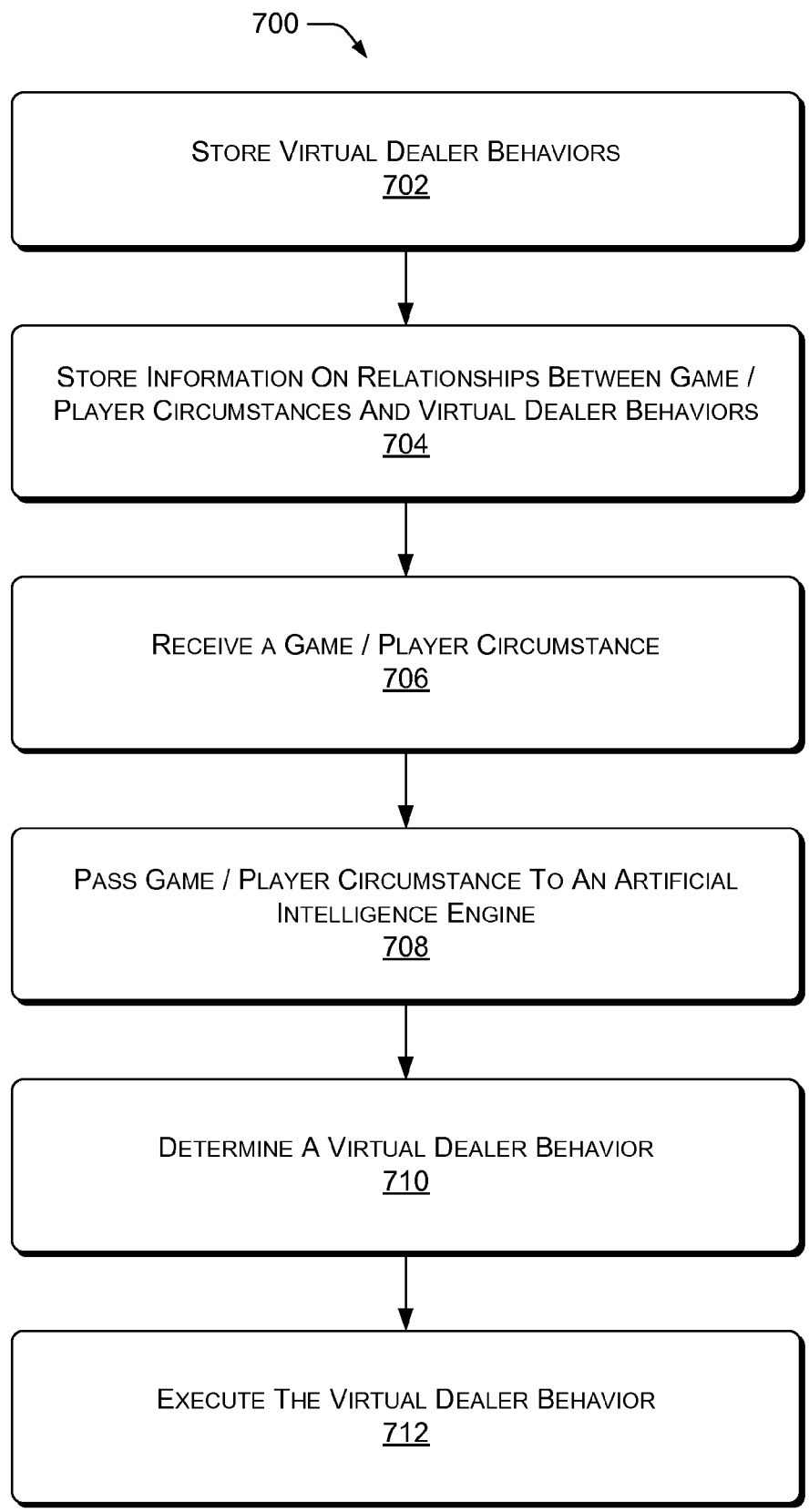
FIG. 7 is a flow diagram of an exemplary method of implementing a virtual game dealer based on artificial intelligence.

FIG. 7 shows an exemplary method 700 of implementing a virtual game dealer that is based on artificial intelligence. In the flow diagram, the operations are summarized in individual blocks. The exemplary method 700 may be performed by the exemplary virtual dealer frameworks 502 & 602.

At block 702, virtual dealer behaviors are stored. That is, various gesture segments (such as raising a hand, pointing a finger, dealing a card, or nodding "yes") and various speech segments (such as "yes," "no," "pleased to meet you Mr. Smith, or "your strategy really paid off") are placed into a data storage structure (e.g., a relational database, a data tree, a spreadsheet, a table, and so forth) where the behaviors can be accessed. Each behavioral element may be indexed with multiple keys, for example the speech behavior "Goodnight!" might be retrieved by multiple different attributes, such as when a player is leaving or as an expression when a player has made a significant win. The stored virtual dealer behaviors need not be a static collection, in one implementation a third party updates databases of possible virtual dealer behaviors while in another implementation the AI engine 102 itself grooms the collections of possible virtual dealer speech and gestures.

At block 704, relationships between game/player circumstances and possible virtual dealer behaviors are stored. Game/player circumstances denote game states, player attributes, and player states. For example, a virtual dealer behavior that is appropriate at a beginning state of a game might be different from a virtual dealer behavior that is called for at the end of the game. The virtual dealer's revealed card hand is another example of a game state. Different virtual dealer behaviors and speech may be appropriate depending on whether the virtual dealer's card hand is weak or strong.

Player attributes may include those qualities of a player that exist outside the duration of a game, as well as those that can be detected during a game. In one implementation, some player attributes are collected via questionnaire, for example, when the player obtains an identity card or smart card 514 for playing games at an establishment. Profile attributes may include, for example, the player's attitude toward game play. The player may indicate that he takes game play very seriously, takes winning or losing very earnestly, and gets very upset upon losing significantly. Another player may indicate the game play is mainly a socializing and drinking forum, and winning or losing does not have a major effect on her mood. These player qualities can become stored player attributes 508, and provide the AI engine 102 with guidance, conditions, and parameters for selecting appropriate speech and behavior. For example, the AI engine 102 may signal the emotion engine 638 and the character engine 644 to severely curtail levity when serious/sensitive players are at the electronic game table 100.

Relationships between possible stimuli 402 (the game states, player attributes, and player states) and intelligent reactions 406 (appropriate virtual dealer speech and gestures), that is, the knowledge 408, is stored and developed. The stored knowledge 408 of relationships between input circumstances and selected courses of action can be developed by a third party and periodically updated and/or can be learned and groomed by the AI engine itself 102. The knowledge 408 may include information reflecting the complementary nature of a circumstance and an associated response, and the suitability of selecting one response over another.

At block 706, a particular game/player circumstance is received. One or more game states can be received from the game processor, and player states and attributes can be gathered in real time via user input and machine observation, and from a maintained database of player attributes 508.

At block 708, the received game/player circumstance is passed to an artificial intelligence (AI) engine.

At block 710, the AI engine determines a virtual dealer behavior that is an appropriate reaction to the received game/player circumstance.

At block 712, the determined virtual dealer behavior is executed.

Exemplary AI Engine

Figure 8:
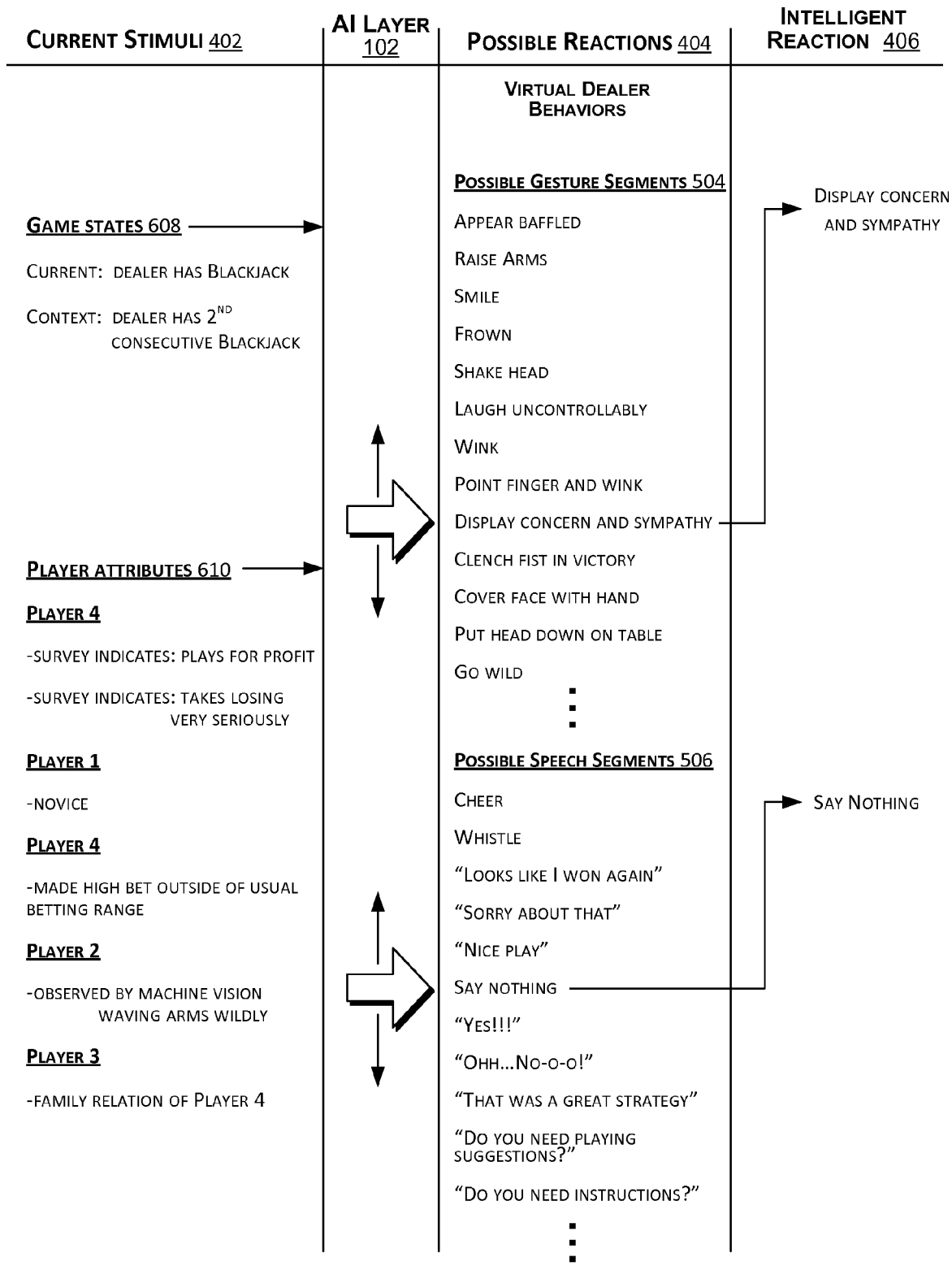
FIG. 8 is a diagram of artificial intelligence applied to a set of particular circumstances in order to select an intelligent reaction for a virtual dealer from among multiple possible reactions.

FIG. 8 shows an example set of circumstances 402 operated on by the AI engine 102 to select an intelligent reaction 406 for a virtual dealer 106 from among multiple possible responses 404. The set of circumstances, or current stimuli 402, consist of game states 608 and player attributes 610. The AI engine 102, shown as an "AI layer" 102, applies the stored knowledge 408 and/or associations determined in real time between the different types of current stimuli 402 to select a "best" gesture behavior and a "best" speech behavior from possible gesture segments 504 and possible speech segments 506. In the shown scenario, Player 4 has previously indicated to a database of player attributes 508 that he is a type of game player that plays for profit, not entertainment, and that he takes losing seriously. Player 3 is a relation of Player 4 and is also present at the same electronic game table 100. The current stimuli 402 also contain input that the dealer has just won a second consecutive Blackjack. The AI engine 102 determines that the virtual dealer will display visuals that show concern and sympathy, and in this case, will say nothing.

In one implementation, the virtual dealer frameworks 502 & 602 are fully programmable with defaults and preferences. Because the virtual dealer 106 emulates a live human host, and because most players have feelings toward the money they bet, win, and lose, the virtual dealer 106 that is based on artificial intelligence is preferably sensitive and discrete with players and their circumstances. A safe default in almost any circumstance is for the virtual dealer 106 to say and do nothing. Silence and inaction of the virtual dealer 106 are generally preferable to the virtual dealer 106 saying something that offends or behavior and speech that is unduly repetitive and therefore unrealistic with respect to emulating a human host. The threshold at which the virtual dealer 106 speaks and acts is adjustable in the exemplary virtual dealer frameworks 502 & 602. Likewise, speech and behavior quality control can be implemented to assure that the associations made by the AI engine 102 to generate appropriate responses are strong and dependable. The virtual dealer frameworks 502 & 602 can also be trained to a satisfactory level before being released into a live gaming environment.

Figure 9:
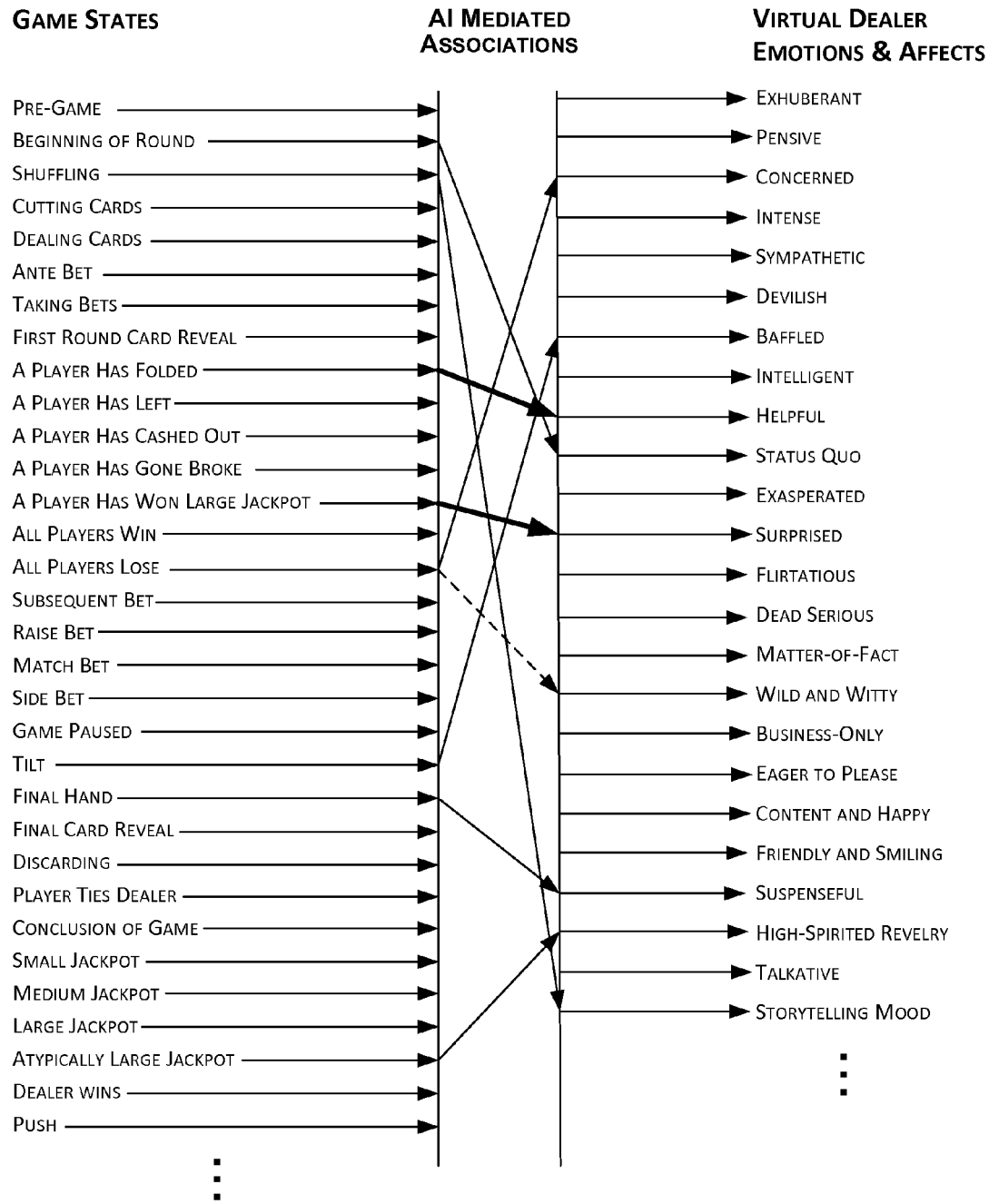
FIG. 9 is a diagram of exemplary knowledge consisting of relationships between game states and virtual dealer emotions/affects, to be used by the AI engine in decision-making.

FIG. 9 shows exemplary knowledge 408 consisting of relationships between game states 608 and virtual dealer emotions/affects. The associations between game states 608 and virtual dealer emotions may be weighted or otherwise characterized, to assist with decision-making processes. For example, an association may be marked in the knowledge 408 as weak, normal, strong, or forbidden. The associations may be tentatively placed or learned by the AI engine 102 and subject to change and development; or may be placed as an initial set of associations to give the AI engine 102 a starting point; or may be hardwired as an initial set of associations that cannot be changed, but other associations can be formed around the initial set.

The shown tabular listing in FIG. 9 is only one way to arrange relationships between stimuli and reactions. Moreover, the shown tabular listing in FIG. 9 only depicts one type of relationship: between game states and possible emotions displayable by the virtual dealer 106. Many other types of relationships can be simultaneously considered by the AI engine 102 in making a selection for a single speech or gesture behavior of the virtual dealer 106. For example, besides consulting the shown knowledge 408 relating to game states and possible emotions, the AI engine 102 can also consult knowledge 408 related to game states and possible gestures, game states and possible speech segments, emotions and possible gestures, emotions and possible speech segments, and so forth. The knowledge 408 is thus used by the AI engine 102 in decision-making. The AI engine 102 may consult many such tables of relationships contained within the knowledge 408 in order to select a virtual dealer speech or behavior, and/or in order to set up variables in the nodes of the neural network 604 for such decision-making.

In one implementation, the AI engine 102 can be based on an (artificial) neural network (ANN) 604. In one implementation, the neural network 604 is a non-linear statistical data modeling and decision-making tool that models complex relationships between inputs and outputs to find patterns in data. Similarly, the neural network 604 may also be applied in the machine perception engine 626 and the natural language processor 628. In one implementation, the neural network 604 is based on statistical estimation and may also apply control theory to optimize a best intelligent reaction 406. The neural network 604 constitutes interconnected nodes (network of artificial "neurons") that use a computational model that is based on the interconnection. The neural network 604 can adapt its interconnected structure based on the current knowledge 408 and the current input, such as the current stimuli 402 and the possible virtual dealer gestures 504 and possible virtual dealer speech 506 represented in the network of nodes.

In a general sense, the neural network 604 infers a function, i.e., the virtual dealer's best intelligent reaction 406, from current data and observations. Depending on particular implementation of the AI engine 102, the neural network 604 may also perform such functions as pattern and sequence recognition, sequential decision-making, face and object identification and recognition, and sequence recognition to identify gestures and speech.

In one implementation, the neural network 604 applies Bayesian methods. A Bayesian network is a probabilistic graphical model that represents a set of variables and their probabilistic independencies. For example, a Bayesian network can represent the probabilistic relationships between a set of current stimuli 402 and various intelligent reactions 406. Given game states 608 and player attributes 610, the neural network 604 can compute the probabilities of various possible gestures 504 and speech contents 506 to select a best intelligent reaction 406.

The Bayesian network may be a directed acyclic graph with nodes that represent variables, and arcs that encode conditional independencies between the variables. Nodes can represent many kinds of variables, e.g., a measured parameter, a latent variable, or a hypothesis. Known techniques perform efficient inference and learning in Bayesian networks. A dynamic Bayesian implementation of the neural network 604 models sequences of variables, for example, the player attributes 610 and game state 608 (or if used in the natural language processor 628, the speech signals).

In one implementation, the neural network is Bayesian and can determine updated knowledge 408 of the state of a subset of variables when other variables from the player attributes queue 610 and the game state queue 608 are observed. The neural network 604 can use probabilistic inference to compute the posterior distribution of variables given new current stimuli 402. The posterior gives a statistic for minimizing the probability of decision error.

The AI engine 102 may be trained based on input, including player attributes 610 derived from database or observation, game states 608, possible gestures 504, and possible speech contents 506. Using the input, the AI engine 102 may implement an iterative training process. Training can be based on different learning rules and training techniques. Example learning techniques include back propagation, interpolation, application of weighted sums, real time recurrent learning, pattern learning, temporal difference learning, etc.

The AI engine 102 may learn to modify the behavior of the virtual dealer 106 in response to changes in the game environment. Knowledge 408 assists the AI engine 102 to determine an appropriate response to new current stimuli 402. For example, the knowledge 408 may represent relationships between particular stimuli 402 and possible intelligent reactions 406. Since the AI engine 102 may learn to modify the behavior of the virtual dealer 106, relationships for a comprehensive set of current stimuli 402 and associated intelligent reactions 406 do not have to be stored and updated by the AI engine 102 or other parts of the virtual dealer framework 602. The AI engine 102 may adaptively select an intelligent reaction 406 for which a relationship with a set of associated current stimuli 402 is not stored.

The database of possible gestures 504 and the database of possible speech contents 506 may be maintained by the AI engine 102 or may be updated by a service provider. Thus, a support service may periodically reinvigorate the virtual dealer 106 with innovative new speech and behaviors, or the virtual dealer framework itself 602 may arrive at new intelligent reactions 406.

Alternative Implementations

A virtual player 302 (or bystander) based on artificial intelligence can be used in addition to the virtual dealer 106, as shown in FIG. 3. The presence of a virtual player 302, whether presented on a video display 108 or cast as a hologram 202, opens new possibilities. Instead of relying on a monologue when the virtual dealer 106 explains a rule of the game or tells a story, the presence of the virtual player 302 allows information to be passed to the players via a dialogue between the virtual dealer 106 and the virtual player 302, over which the virtual dealer frameworks 502 & 602 have complete control. In other words, imparting information by a dialogue between the virtual dealer 106 and a real player runs certain risks. The real player may be unresponsive or may sidetrack the dialogue with atypical questions or responses.

For performing entertainment, the presence of the virtual player 302 allows a brief skit, joke, chip trick, card trick, etc., involving two people to be performed with perfect execution between the virtual dealer 106 and the virtual player 302. That is, the virtual dealer 106 and virtual player 302 can be programmed to perform without the possibility of human intervention that could introduce an embarrassing mistake or misstep.

Likewise, the virtual player 302 can model how to interact with the virtual dealer 106. The real players only need imitate the virtual player 302 to fully connect with the virtual dealer 106. Even without presence of the virtual dealer 106, a virtual player 302 animated by artificial intelligence can model how to play the game, so that new players only need to follow the lead and verbal tips from the virtual player 302.

In another alternative implementation, the virtual dealer frameworks 502 & 602 are used to animate a virtual bartender instead of a virtual game dealer. Not all jurisdictions allow a nonhuman drink host. In one implementation, the virtual bartender converses with a client and accepts some drink orders verbally. A verbal drink order is typically verified by additional queries that repeat back the order or part of an order to make sure it was heard correctly. In one implementation, drink orders can also be entered by user interface, such as a touch screen display. In one implementation, a breathalyzer is added to the virtual dealer frameworks 502 & 602 and orders subjected to breathalyzer input.

Example Electronic Game Tables

Figure 10:
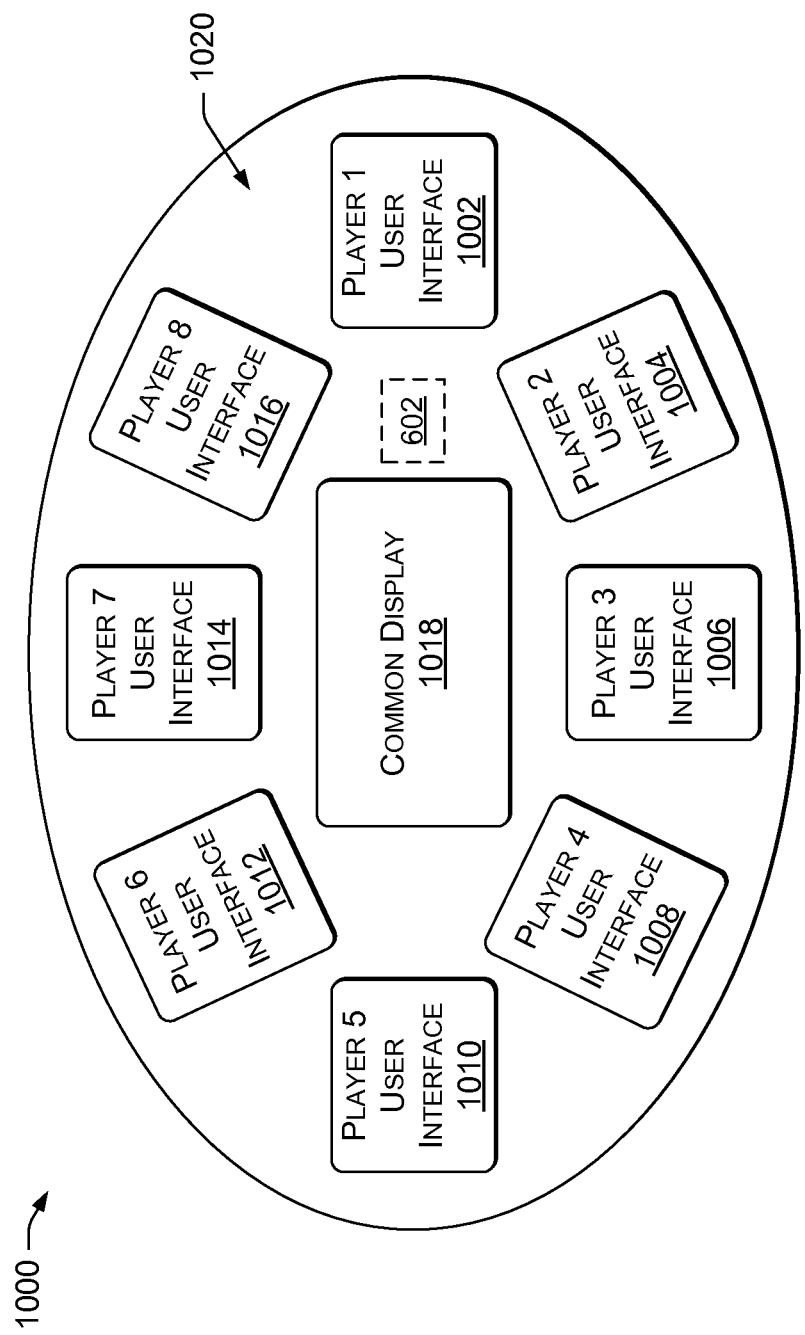
FIG. 10 is a diagram of an example electronic game table layout for use with a virtual dealer or a virtual player based on artificial intelligence.

FIG. 10 shows an example layout of an electronic game table 1000. The illustrated example game table 1000 has an arbitrary size that in shown version seats eight participants maximum. Other implementations can seat a different number of participants. The game table 1000 has a user interface for each participant, i.e., participant user interfaces 1002, 1004, 1006, 1008, 1010, 1012, 1014, and 1016. A participant's user interface 1002 may consist of an electronic display for presenting visual images and may further consist of a touch screen display for interactive capability. Depending upon implementation, each participant user interface 1002 may also include various other forms of interactive interface, such as pointing devices, light sensors, wagering chip sensors, audio speakers, etc.

The illustrated example game table 1000 may also include a common display 1018 in the center of the game table 1000, for presenting visual information to all participants. The common display(s) 1018 may present general information redundantly in two, four, or more visual orientations so that the displayed information is oriented correctly for each participant.

The example electronic game table 1000 of FIG. 10 has an example layout that is useful for unhosted card games, although using a live dealer at game table 1000 is not ruled out. The example game table 1000 as shown typically uses virtual playing cards and virtual chips. However, the game table 1000 can be configured to use any combination of real playing cards, virtual playing cards, real wagering chips, and/or virtual gaming chips. When real playing cards are used, a live shoe that reads the identity of each card sends the card identity information to the electronic processor (not shown) that runs the game. When real wagering chips are used, light sensors, optical sensors, scanning technology, weigh cells, RFID technology, etc., may be used with specially constructed chips or conventional standard chips to sense chip presence and chip values.

Figure 11:
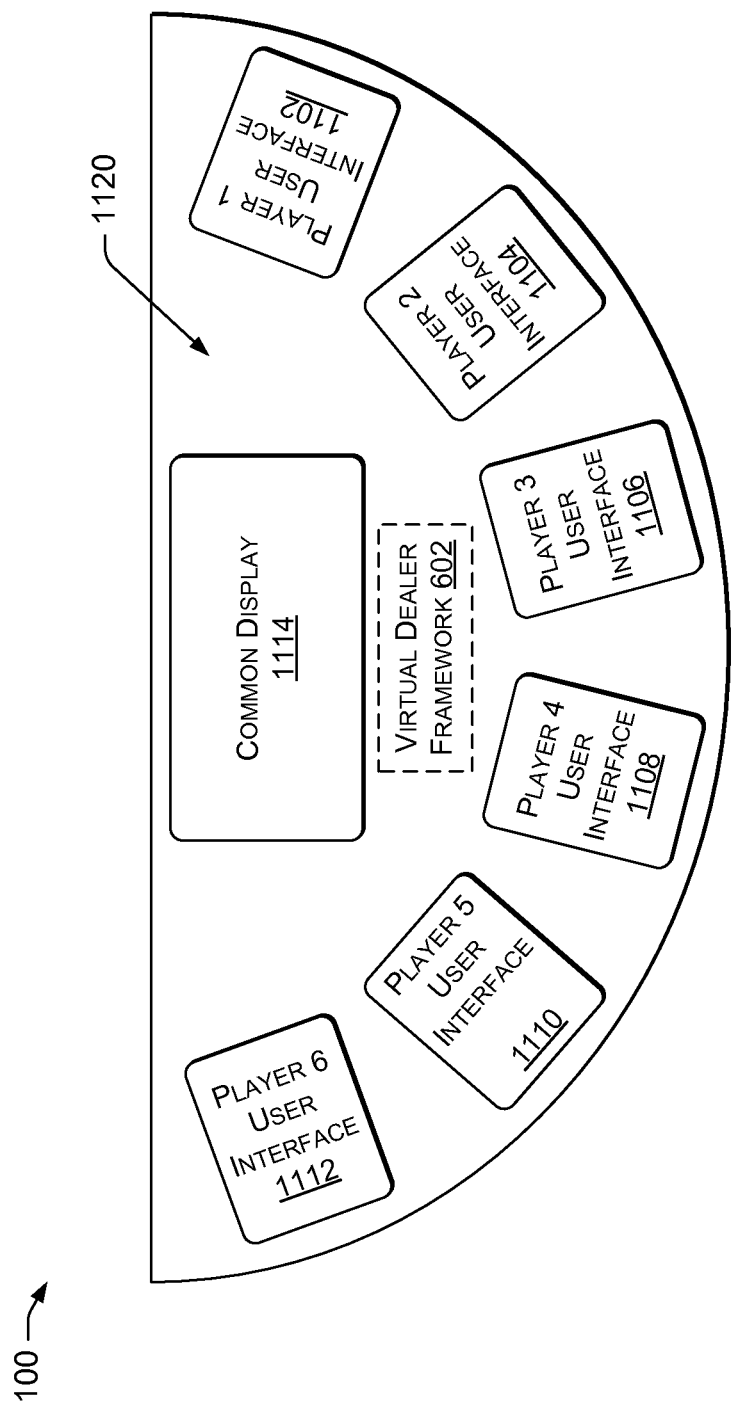
FIG. 11 is a diagram of another example electronic game table layout (of FIG. 1) for use with a virtual dealer or a virtual player based on artificial intelligence.

FIG. 11 shows another example layout of an electronic game table 100. In the illustrated example game table 100, multiple user interfaces 1102, 1104, 1106, 1108, 1110, and 1112 form a semi-circular array for seating participants. The participant user interfaces may consist of electronic visual displays with touch screen capability or other forms of user interface. The example game table 100 is shaped to accommodate a virtual dealer 106 on the opposing side of the semi-circular array. When the example game table 100 is not hosted, a common display 1114 can be included on the side opposing the participants' semi-circle.

Figure 12:
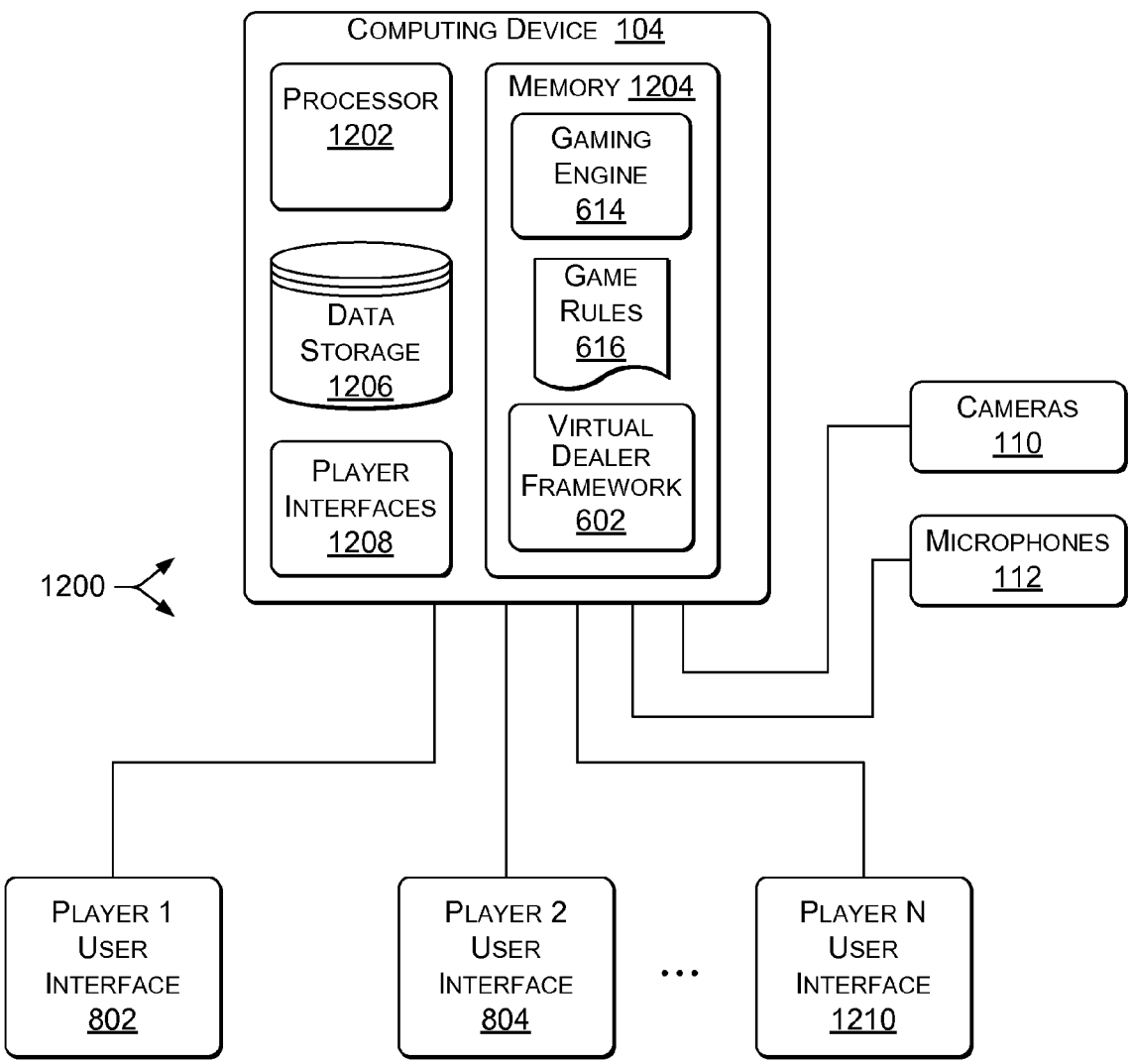
FIG. 12 is a block diagram of an exemplary computing system for hosting a virtual dealer framework for an electronic game.

FIG. 12 shows an example game processing system 1200 that can be included in game tables, such as in the game tabletops for electronic game tables 800 and 100. The illustrated configuration of the exemplary game processing system 1200 is meant to provide only one example arrangement for the sake of overview. Many other arrangements of the illustrated components, or similar components, are possible within the scope of the subject matter. Such an exemplary game processing system 1200 can be executed in hardware, or combinations of hardware, software, firmware, etc.

The exemplary game processing system 1200 includes a computing device 104, which may be a desktop, server, or notebook style computer, or other device that has processor, memory, and data storage. The computing device 104 thus includes a processor 1202, memory 1204, data storage 1206; and interface(s) 1208 to communicatively couple with the participant "1" user interface 802, the participant "2" user interface 804, ..., and the participant "N" user interface 1210. The game processing system 1200 includes a gaming engine 614, and game rules 616, shown as software loaded into memory 1204. In one implementation, components of the virtual dealer frameworks 502 & 602 may also be loaded into the same memory 1204.

The interfaces 1208 can be one or more hardware components that drive the visual displays and communicate with the interactive components, e.g., touch screen displays, of the multiple participant user interfaces 802, 804, ..., 1210.

Figure 13:
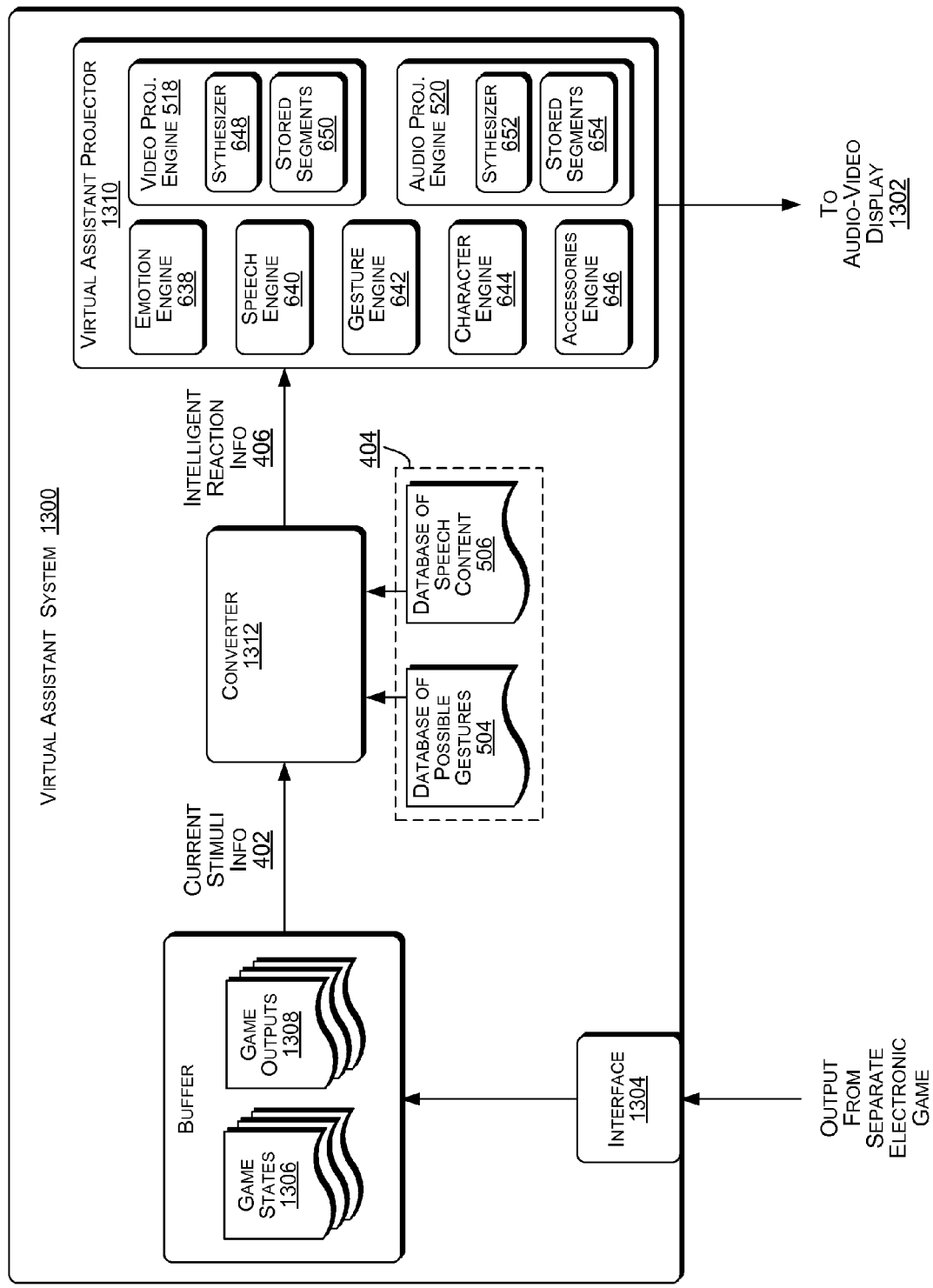
FIG. 13 is a diagram of an example virtual assistant system.

FIG. 13 shows an example virtual assistant system 1300. In an implementation, the virtual assistant system 1300 includes a video and audio display 1302, an interface 1304 suitable for receiving data communication representing standard game states 1306 and standard game outputs 1308 from a separate electronic game, a virtual assistant projector 1310 to animate an automated virtual assistant on the video and audio display 1302, and a game output converter 1312 to translate standard game states 1306 and standard game outputs 1308 from the interface 1304 into animated behavior information and animated speech information for input to the virtual assistant projector 1310.

The standard game states 1306 and the standard game outputs 1308 received by the game output converter 1312 may have been formatted by the separate electronic table to provide a textual visual display or a non-speech audio display, when displayed conventionally.

The virtual assistant projector 1310 and the game output converter 1312 are separate from, accessory to, and passive with respect to a main game engine of the separate electronic game. The computer processing of the system 1300 is operationally and communicatively isolated from a main game engine of the separate electronic game. The system 1300 functions as an accessory user interface or projection device for the standard game states 1306 or the standard game outputs 1308 of an electronic game.

In an implementation, the system 1300 interfaces with a separate electronic game via XML socket connections. The system 1300 may also use a flash platform. In one example, the system 1300 communicates with a separate electronic game via a USB port. A device driver may signal the virtual assistant projector 1310 based on the standard game outputs 1308.

The system 1300 may reside in a modular packaging for retrofitting the system as an accessory near the separate electronic game. The automated virtual assistant functions as an animated bystander accessory speaking and acting the standard game state information 1306 and the standard game outputs, 1308 wherein the standard game state information 1306 and the standard game outputs 1308 are conventionally displayable when the system is disconnected from the separate electronic game.

The system may be cast in an apparatus that includes an audio-video display, a stand for supporting the audio-video display 1302 and for placing the audio-video display 1302 in a standalone position near a separate electronic game, the interface 1304 for receiving standard output 1308 from the separate electronic game, and the converter 1312 for translating the standard game output 1308 to an animated behavior and an animated speech of a virtual human bystander being shown on the audio-video display 1302.

The apparatus receives one-way communication from the separate electronic game and does not communicate back to the separate electronic game.

The converter 1312 translates standard game states 1306 and standard game outcomes into virtual human behaviors and virtual human speech of the virtual human bystander. The virtual human bystander speaks or acts information from the standard game output 1308 including welcomes, rules, instructions, wagering limits, and outcomes.

The apparatus may include customizable billboards, backgrounds, foregrounds, and articles to be displayed with the virtual human bystander.

In an implementation, the converter 1312 is extended to respond to player decisions and interactions, translating the responses to animated behavior and animated speech for the virtual human bystander.

CONCLUSION

Although exemplary systems have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

The invention claimed is:

1. A system for use with a separate electronic game table, the system comprising:
   a video and audio display;
   an interface suitable configured with instructions to receive data representing standard game states and standard game output from the separate electronic game table;
   a circumstances inventory (CI) engine that includes a game states queue and a player attributes queue, and wherein the CI engine is programmed with instructions to:
      collect current standard game states via the interface for the game states queue, and
      receive player information for the player attributes queue from a player tracking platform, wherein the player tracking platform is physically separate from the system;
   an artificial intelligence (AI) engine in communication with the CI engine, and wherein the AI engine is configured with instructions to:
      create associations between received standard game states and possible emotions for a virtual assistant,
      create associations between player attributes and possible emotions for the virtual assistant,
      save the associations, and
      select an emotion for the virtual assistant based on the associations;
   a game output converter configured with instructions to translate the data received from the interface representing the standard game states and standard game output and received player information into animated behavior information and animated speech information for input to a virtual assistant projector, wherein the interface, the virtual assistant projector and the game output converter are separate from and passive with respect to a main game engine of the separate electronic game table; and
   wherein the virtual assistant projector is configured with possible emotions for the virtual assistant and with instructions to animate the virtual assistant on the video and audio display based on the animated behavior information, the animated speech information and the selected emotion.

2. The system of claim 1, wherein the standard game states and the standard game output received by the game output converter have been formatted by the electronic game table to provide a textual visual display or a non-speech audio display.

3. The system of claim 1, wherein computer processing of the system is operationally and communicatively isolated from the electronic game table.

4. The system of claim 1, wherein the system functions as an accessory user interface or projection device for the standard game states or the standard game output of an electronic game played by the main game engine of the separate electronic game table.

5. The system of claim 1, wherein the interface comprises at least an XML socket connection.

6. The system of claim 5, wherein the interface further comprises a flash platform.

7. The system of claim 1, wherein the interface communicates via a USB port.

8. The system of claim 7, further comprising a device driver to signal the virtual assistant projector based on the standard game output.

9. The system of claim 7, further comprising a modular packaging for retrofitting the system as an accessory near the electronic game table.

10. The system of claim 1, wherein the virtual assistant functions as an animated bystander accessory speaking and acting based on data representing the standard game state information and the standard game output, wherein the standard game state information and the standard game output are conventionally displayable when the system is disconnected from the electronic game table.

11. An apparatus for use with a separate electronic game, the apparatus comprising:
   an audio-video display;
   a stand for supporting the audio-video display and for placing the audio-video display in a standalone position near a separate electronic game;
   an interface for receiving standard output from the separate electronic game;
   a circumstances inventory (CI) engine that includes a game states queue and a player attributes queue, and wherein the CI engine is programmed with instructions to:
      collect current standard game states in the game states queue, and
      receive and store player information in the player attributes queue, wherein the player information is derived from a player tracking platform, wherein the player tracking platform is physically separate from the apparatus;
   an artificial intelligence (AI) engine in communication with the CI engine, and wherein the AI engine is configured with instructions to:
      create associations between received standard game states and possible emotions for a virtual human bystander,
      create associations between received player information and possible emotions for the virtual human bystander,
      save the associations, and
      select an emotion for the virtual human bystander based on the saved associations;
   a converter configured with instructions to translate the standard game output or a standard game state to an animated behavior and an animated speech for the virtual human bystander; and
   a projector configured with instructions to display on the audio-video display the virtual human bystander based on the animated behavior, the animated speech and the selected emotion for a current game state.

12. The apparatus of claim 11, wherein the interface is configured with instructions to receive one-way communication from the separate electronic game and does not communicate back to the separate electronic game.

13. The apparatus of claim 11, wherein the virtual human bystander speaks or acts information to communicate welcomes, rules, instructions, wagering limits, and outcomes based on a current state of the separate electronic game.

14. The apparatus of claim 11, further comprising a customizable billboard, background, foreground, or artifact to be displayed with the virtual human bystander.

15. The apparatus of claim 11, wherein the converter is further configured with instructions to respond to a player interaction with the game by translating the player interaction into an animated behavior and an animated speech for the virtual human bystander.

16. The apparatus of claim 11, wherein the apparatus is configured with instructions to receive possible animated behaviors, possible animated speeches and possible emotions from a service provider.

17. The apparatus of claim 11, wherein the created associations are marked according to one of a list consisting of weak, normal, strong and forbidden, wherein the marking assists the AI engine in selecting the emotion.

* * * * *